No. 737,333. PATENTED AUG. 25, 1903.
A. E. BUNT.
ROOT PULLER.
APPLICATION FILED DEC. 4, 1902.
NO MODEL.
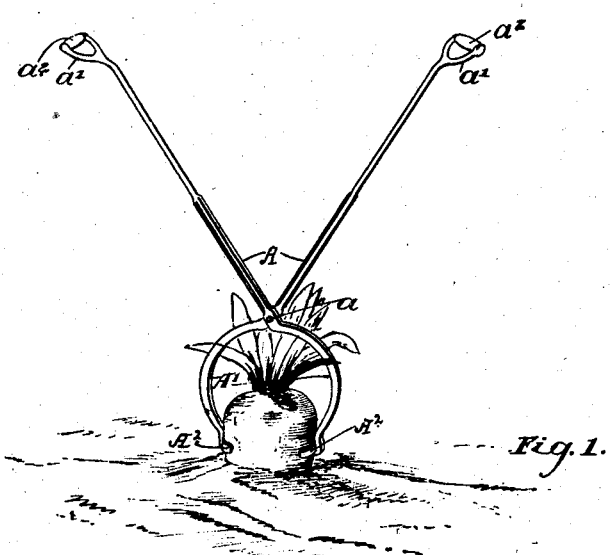
Fig. 1.
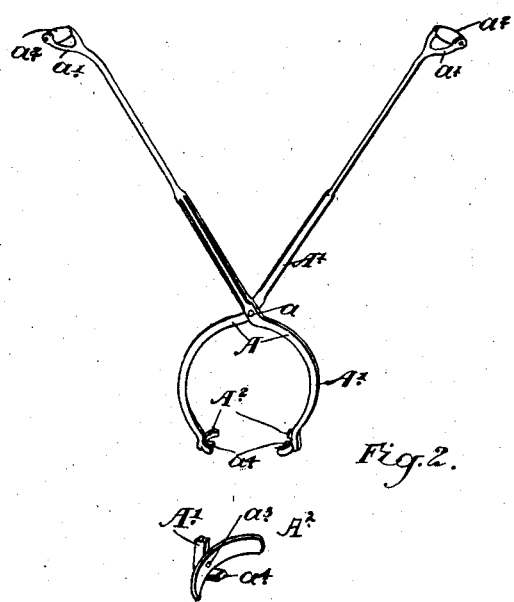
Fig. 2.
Fig. 3.
Witnesses. Inventor:

No. 737,333. Patented August 25, 1903.

UNITED STATES PATENT OFFICE.

ALFRED ERNEST BUNT, OF VALLENTYNE, CANADA, ASSIGNOR OF ONE-HALF TO WILLIAM SHIER, OF SUNDERLAND, CANADA.

ROOT-PULLER.

SPECIFICATION forming part of Letters Patent No. 737,333, dated August 25, 1903.

Application filed December 4, 1902. Serial No. 133,937. (No model.)

*To all whom it may concern:*

Be it known that I, ALFRED ERNEST BUNT, blacksmith, of Vallentyne P. O., in the county of Ontario, in the Province of Ontario, Canada, have invented certain new and useful Improvements in Root-Pullers, of which the following is a specification.

My invention relates to improvements in root-pullers, more particulary adaptable for pulling such roots as carrots, turnips, beets, and parsnips; and the object of the invention is to devise a very simple device of this class whereby the rapidity of the pulling of these vegetables may be greatly facilitated; and it consists, essentially, of a tongue-shaped device provided with cross-handles and arc-shaped gripping ends each having a centrally-depending lip or lug, as hereinafter more particularly explained.

Figure 1 is a perspective view of my improved root-puller, showing its practical application. Fig. 2 is a perspective view of the root-puller. Fig. 3 is a detail of the arc-shaped end.

In the drawings like letters of reference indicate corresponding parts in each figure.

A represents the two members of the root-puller, which are pivoted together on a central rivet $a$ and are provided at the top with the forks $a'$, between the sides of which extends the handle $a^2$.

It will be noticed that the bottom ends of the root-puller below the pivotal rivet $a$ are provided with arc-shaped portions A', extending longitudinally of the members, such arc-shaped portions ending in a crosswise arc-shaped portion $A^2$, in the center of which extends the end of the portion A', which is bent straight down, so that the arc-shaped portion $A^2$ may be affixed thereto, and then inwardly to form gripping lugs or lips $a^4$. The arc-shaped portion $A^2$ is secured by suitable rivets $a^3$ to the bottom of each member, and such arc-shaped portions extend equally to the front and rear of the lips $a^4$.

It will be seen from the construction of my root-puller that by gripping the portions $a^2$ and spreading out the upper portion of the root-puller the lower portion below the pivot-point $a$ is likewise spread out, so that by pressing inwardly the root may be gripped as indicated in Fig. 1 and I find in practice when so gripped may be removed quickly and without injury to the root itself, and, in fact, from actual demonstration I have found that one boy can do the work of five men, as he can move very rapidly along the rows on account of having no bending to do.

What I claim as my invention is—

A root-puller for beet-roots comprising a pair of elongated handle members pivotally connected together, and having lower portions curved outwardly and then inwardly to provide an enlarged space between for the top of the beet-root, curved grips secured to the free ends of said lower portions adapted to press against the sides of the beet close to the ground and lugs or lips also carried at the free ends of said lower portions and projecting inwardly beyond the inner faces of the grips whereby they are adapted to penetrate the beet at the points where it is held by the side grips, substantially as described.

ALFRED ERNEST BUNT.

Witnesses:
B. BOYD,
M. McLAREN.